United States Patent
Obata et al.

(10) Patent No.: US 10,802,712 B2
(45) Date of Patent: Oct. 13, 2020

(54) INFORMATION PROCESSING APPARATUS AND METHOD OF PROCESSING INFORMATION

(71) Applicant: Axell Corporation, Tokyo (JP)

(72) Inventors: Atsushi Obata, Tokyo (JP); Kenta Matsumoto, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 0 days.

(21) Appl. No.: 15/293,162

(22) Filed: Oct. 13, 2016

(65) Prior Publication Data

US 2017/0102880 A1    Apr. 13, 2017

(30) Foreign Application Priority Data

Oct. 13, 2015 (JP) ................................. 2015-202472
Sep. 6, 2016 (JP) ................................. 2016-173829

(51) Int. Cl.
*G06F 3/06* (2006.01)
*G06F 12/02* (2006.01)

(52) U.S. Cl.
CPC .......... *G06F 3/0604* (2013.01); *G06F 3/0644* (2013.01); *G06F 3/0679* (2013.01); *G06F 12/0246* (2013.01); *G06F 2212/1024* (2013.01); *G06F 2212/7203* (2013.01); *G06F 2212/7206* (2013.01)

(58) Field of Classification Search
CPC .... G06F 3/0604; G06F 3/0638; G06F 3/0685; G06F 12/0802; G06F 2212/60
See application file for complete search history.

(56) References Cited

U.S. PATENT DOCUMENTS

| | | | | |
|---|---|---|---|---|
| 7,447,807 | B1 * | 11/2008 | Merry | G06F 3/0604 710/8 |
| 2002/0169022 | A1 * | 11/2002 | Canterbury | G06F 12/1433 463/29 |
| 2003/0212855 | A1 * | 11/2003 | Sakaguchi | G06F 12/121 711/113 |
| 2004/0078518 | A1 | 4/2004 | Kuwata | |
| 2005/0235108 | A1 | 10/2005 | Hiratsuka | |

(Continued)

FOREIGN PATENT DOCUMENTS

| | | |
|---|---|---|
| CN | 1690985 A | 11/2005 |
| JP | 64-018843 A | 1/1989 |

(Continued)

OTHER PUBLICATIONS

Taiwanese Office Action dated Feb. 20, 2020 in Taiwanese Application No. 105132573, 6 pages.

*Primary Examiner* — William B Partridge
*Assistant Examiner* — Eric T Loonan
(74) *Attorney, Agent, or Firm* — Masuvalley & Partners (57) ABSTRACT

To avoid the situation that only specific data in date corresponding to a plurality of data types occupies a temporary storing part.
An interface control part 26 of a data processing processor 10 sets data type information according to a data type of data which is requested to read. A memory controller 46 of an auxiliary storage device 40 controls the auxiliary storage device 40 to determine the data type requested based on the data type information contained in a read command from the data processing processor 10 and select a temporary storing region corresponding to the data type.

4 Claims, 7 Drawing Sheets

(56) References Cited

U.S. PATENT DOCUMENTS

| | | |
|---|---|---|
| 2006/0069738 A1 | 3/2006 | Hoogerbrugge |
| 2006/0257106 A1 | 11/2006 | Yamagata et al. |
| 2007/0088666 A1* | 4/2007 | Saito .................... G06F 3/0613 |
| 2009/0019234 A1* | 1/2009 | Im ....................... G06F 12/0895 711/141 |
| 2015/0039833 A1* | 2/2015 | Chang ................ G06F 12/0848 711/129 |

FOREIGN PATENT DOCUMENTS

| | | |
|---|---|---|
| JP | 2003-115168 A | 4/2003 |
| JP | 2003-330792 A | 11/2003 |
| JP | 2005-531860 A | 10/2005 |
| TW | 200705396 A | 2/2007 |
| WO | WO2004/006097 A2 | 1/2004 |

* cited by examiner

| Register | 7 | 6 | 5 | 4 | 3 | 2 | 1 | 0 |
|---|---|---|---|---|---|---|---|---|
| Features[7:0] | Sector Count 7:0 ||||||||
| Features[15:8] | Sector Count 15:8 ||||||||
| Count[7:0] | TAG |||| Reserved ||||
| Count[15:8] | PRIO(1:0) || Reserved ||||||
| LBA[7:0] | LBA[7:0] ||||||||
| LBA[15:8] | LBA[15:8] ||||||||
| LBA[23:16] | LBA[23:16] ||||||||
| LBA[31:24] | LBA[31:24] ||||||||
| LBA[39:32] | LBA[39:32] ||||||||
| LBA[47:40] | LBA[47:40] ||||||||
| ICC | ICC ||||||||
| Auxiliary[7:0] | Reserved ||||||||
| Auxiliary[15:8] | Reserved ||||||||
| Device | FUA | 1 | Res | 0 | Reserved ||||
| Command | 60h ||||||||

INFORMATION PROCESSING APPARATUS AND METHOD OF PROCESSING INFORMATION

This application claims priority under 35 U.S.C. § 119 to Japanese patent application Serial No. 2015-202472, filed Oct. 13, 2015, Japanese patent application Serial No. 2016-173829, filed Sep. 6, 2016, which are incorporated herein by reference in their entirety.

TECHNICAL FIELD

The present invention relates to an information processing apparatus suitable for treating plural kinds of data each having a different lifetime and data size and a method of processing information.

BACKGROUND ART

A game machine such as a pachinko machine and a pachislot machine is elaborately constituted so that a player during a game enjoys a feeling of great pleasure by providing various kinds of outputs such as still images and video images, sound from a speaker, light emitting by an LED and the like.

Outputs of these images, the sound and the light during the game are implemented by storing data for outputting them in the game machine preliminarily, reading the data according to progress of the game at the time of playing the game, and outputting as the images, the light and the sound by a predetermined data conversion. In further details, these image data, sound data and light emitting data are written in a read only memory by compression coding at the time of producing the game machine. At the time of playing the game, a processor dedicated for processing these data reads the data from the read only memory as needed to decode, thereby outputting the processed data to a liquid crystal device, a speaker, the LED (Light Emitting Diode) and the like, depending on the data types.

Meanwhile, when the above dedicated data processing processor reads predetermined data from the read only memory, it is required in particular for the game machine to read the data at high speed in order to respond to various and rapidly changing output requests to the liquid crystal device and the like. Therefore, a cache technology is frequently adopted in reading the data from this read only memory. Specifically, the read only memory has a memory (for example, DRAM (Dynamic Random Access Memory)) to function as a cache (read cache) in addition to a main memory (typically, a flush memory) to store the image data, the sound data and the light emitting data, thereby realizing a cache function.

Patent Document 1: JP2003-115168A discloses a configuration having the cache memory (6) at the front stage of the HDD (8), wherein the data to be recorded to the HDD (8) are two kinds of signals including a video signal and a sound signal. The object of the technology disclosed in the Document is that even a combined data size (1 file) of the video and sound signals exceeds the capacity of the HDD (8), such data can be effectively recorded across a plurality of HDDs (8). The configuration to achieve the object is to divide the video and sound signals of the 1 file into a plurality of pieces at points of switching the video and sound signals and configure a divisible file at each point.

Further, Patent Document 2: JPS64-18843A discloses improved applications of the combination technology of the layering technology by two cache memories each having the different capacity and the technology dividing the cache with the instruction and the data (operand). The concrete configuration is to access the first cache memory having the relatively low capacity at the times of the operand access and the branch destination instruction access of the branch instruction and access the second cache memory having the large capacity at the absent time.

Further, Patent Document 3: JP2005-531860A discloses a processing carried out by a plurality of processors, in which there is disclosed an idea that each processor is effectively switched into a low power consumption mode in the case where there is no process to be processed by and in charge of the processor itself, wherein this idea is made on the assumption that each processor includes a cache memory in one by one relationship (see FIG. 1 and FIG. 5).

SUMMARY OF THE INVENTION

However, in the case where the plural kinds of date such as the image data, the sound data and the light emitting data described above are treated, it often happens that the lifetime (a length of time to utilize the data) and the data size (a unit of a communication data amount) are different depending on their data types. In this case, the data of the data type which has basically a big data size and a long lifetime occupies the cache memory disproportionately, so that it may become a situation that it is impossible to process necessary data at a desired timing.

In particular, in the game machine such as the pachinko machine, only the image data having the big data size occupies the cache memory regardless of the fact that the processing of the sound data and the light emitting data is not allowed to delay compared with the image data. Therefore, there is a problem in that the output of the sound and the light delays in excess of an acceptable amount. This is because, for reasons that the data amount of the image data is larger than the sound and light emitting data, occupancy in the cache memory becomes high and thus it becomes difficult that the data such as the sound data and the light emitting data are cached in the cache memory, thereby generating delayed processing.

The present invention is made to solve the above problems. It is an object of the present invention to avoid the situation that only specific data in the data corresponding to the plurality of data types occupies a temporary storing part.

In order to solve the above problems, the invention of claim 1 is characterized in that an information processing apparatus comprises: an auxiliary storage device which includes; a storing part for storing plural kinds of data corresponding to a plurality of data types, a temporary storing part for temporarily storing the data read from the storing part into temporary storing regions corresponding to the data types, and a control part for controlling the storing part and the temporary storing part; and a data processing processor for reading the plural kinds of data from the auxiliary storage device and outputting the data to predetermined processing parts corresponding to the data types, based on a request from a host CPU, wherein the data processing processor includes an interface control part for setting data type information according to the data type of the data which is requested to read, and wherein the control part of the auxiliary storage device controls the auxiliary storage device to determine the data type requested based on the data type information contained in a read command from the data processing processor and select the temporary storing region corresponding to the data type.

According to the present invention, since the temporary storing regions corresponding to the data types of the temporary storing part are selected, it is possible to avoid the situation that only the specific data in the data corresponding to the plurality of data types occupies the temporary storing part.

DETAILED DESCRIPTION OF THE PREFERRED EMBODIMENTS

Hereinafter, description will be made on an embodiment of the present invention with reference to the drawings in details.

The present invention has the following configuration in order to avoid the situation that only the specific data in the data corresponding to the plurality of data types occupies the temporary storing part.

In other words, the information processing apparatus of the present invention is characterized in that it comprises: the auxiliary storage device which includes; the storing part for storing the plural kinds of data corresponding to the plurality of data types, the temporary storing part for temporarily storing the data read from the storing part into the temporary storing regions corresponding to the data types, and the control part for controlling the storing part and the temporary storing part; and the data processing processor for reading the plural kinds of data from the auxiliary storage device and outputting the data to the predetermined processing parts corresponding to the data types, based on the request from the host CPU, wherein the data processing processor includes the interface control part for setting the data type information according to the data type of the data which is requested to read, and wherein the control part of the auxiliary storage device controls the auxiliary storage device to determine the data type requested based on the data type information contained in the read command from the data processing processor and select the temporary storing region corresponding to the data type.

By providing the above configuration, since the temporary storing region corresponding to the data type in the temporary storing part is selected, it is possible to avoid the situation that only the specific data in the data corresponding to the plurality of data types occupies the temporary storing part.

Hereinafter, description will be made on the above features of the present invention with reference to the drawings in details.

<Information Processing Apparatus>

Figure 1:
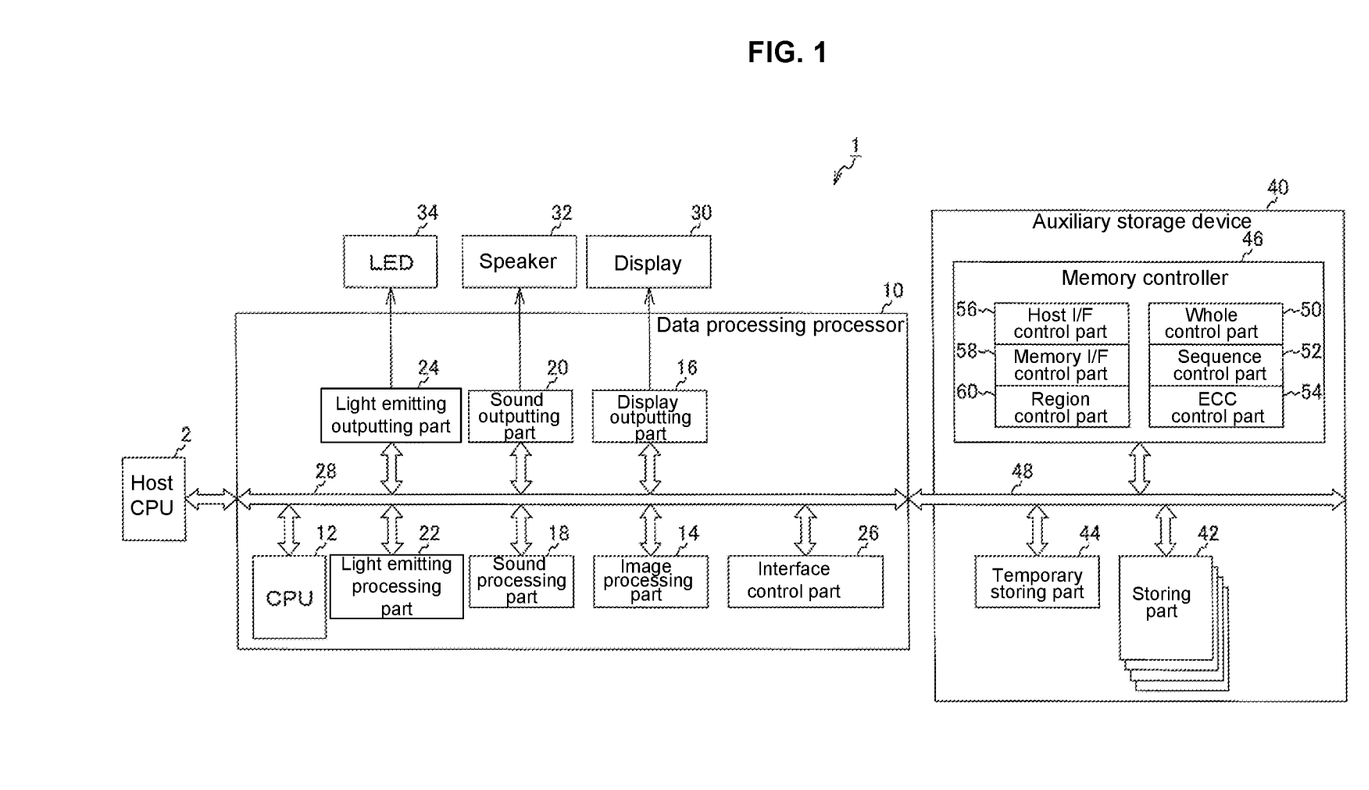
FIG. 1 is a functional block diagram illustrating a configuration of an information processing apparatus according to an embodiment of the present invention.

Description will be made on a configuration of an information processing apparatus according to the embodiment of the present invention with reference to FIG. 1. FIG. 1 is a functional block diagram illustrating a configuration of the information processing apparatus according to the embodiment of the present invention.

The information processing apparatus 1 includes a data processing processor 10 and an auxiliary storage device 40.

A host CPU 2 shown in FIG. 1 is a CPU arranged at a position that governs the information processing apparatus 1 which constitutes a game machine and the like.

The data processing processor 10 is a processor processing data such as an image, sound and light emitting and includes a CPU 12, an image processing part 14, a display outputting part 16, a sound processing part 18, a sound outputting part 20, a light emitting processing part 22, a light emitting outputting part 24, an interface control part 26 and a bus 28.

The CPU 12 controls the whole of the data processing processor.

The image processing part 14 processes the image to be displayed, acquires the data stored in the auxiliary storage device 40 to decode, and generates image data rendering the image.

The display outputting part 16 outputs the image data generated by the image processing part 14 to a display part such as a display 30. The display 30 is a display device such as an LCD.

The sound processing part 18 processes a sound signal to be outputted, acquires the data stored in the auxiliary storage device 40 to decode, and generates sound data.

The sound outputting part 20 outputs the sound signal to a speaker 32 based on the generated sound data.

The light emitting processing part 22 decodes the data stored in the auxiliary storage device 40 to generate date to activate a light emitter such as the LED 34, based on the instructions.

The light emitting outputting part 24 activates the light emitter such as the LED based on the data generated by the light emitting processing part.

The LED (light emitting diode) 34 is a semiconductor element emitting light when a voltage is applied into a forward direction and one example of the light emitter.

The interface control part 26 controls interface between the auxiliary storage device 40 and it. In the present embodiment, it is determined based on a data address contained in a read request that the read request requested by any one of the image processing part 14, the sound processing part 18, the light emitting processing part 22 and others (CPU) is implemented from any processing part or the CPU. In accordance with the determined results, a sector count value (Sector Count) to be contained in the read command which is the read request is set.

The auxiliary storage device 40 includes a storing part (flash memory) 42, a temporary storing part (DRAM) 44, a memory controller 46 and a bus 48.

The auxiliary storage device 40 is a SSD (Solid State Drive) including, as it is called, a NAND flash memory. In this regard, in a usual SSD, the temporary storing part 44 is used as a cache memory for writing. However, the SSD used in the present invention changes a firmware for the SSD and utilizes the temporary storing part 44 as the cache memory for reading. It is to be noted that the DRAM used for writing may not be changed for reading and another DRAM may be prepared for reading.

The storing part 42 is for example a storing part consisting of the NAND flash memory array.

The temporary storing part 44 is for example a temporary storing part consisting of the DDR DRAM and caches readout data.

The memory controller 46 includes a whole control part 50, a sequence control part 52, an ECC (Error Check and Correct) control part 54, a host I/F control part 56, a memory I/F control part 58 and a region control part 60, which controls the auxiliary storage device 40.

The whole control part 50 incorporates a RAM, a ROM and the like (omitted in Figures) and controls the whole of the memory controller 46.

The sequence control part 52 controls an operation of the storing part 42 based on an internal command signal provided from the memory controller 46 to the storing part 42.

The ECC control part 54 detects errors contained in the readout data based on an error collection code added to the readout data and corrects the errors of the data in the case where the errors are detected.

The host I/F control part 56 controls the interface between the host (data processing processor) and it.

The memory I/F control part 58 controls the interface between the NAND array being the storing part 42 and the DRAM being the temporary storing part 44.

The region control part 60 controls the temporary storing regions to store the data in the temporary storing part 44, which correspond to the data types (image, sound, light emitting and the like) to be cached by using the temporary storing part 44.

In this regard, each configuration of the memory controller 46 is implemented by a micro processor of the memory controller 46.

Further, a connection between the bus 28 and bus 48 utilizes a serial high-speed communication bus, PCIe (PCI express) and the like. Each of the buses 28 and 44 is described without distinguishing a data bus with a resister bus for ease of explanation.

<Interface Control Part>

Figure 2:
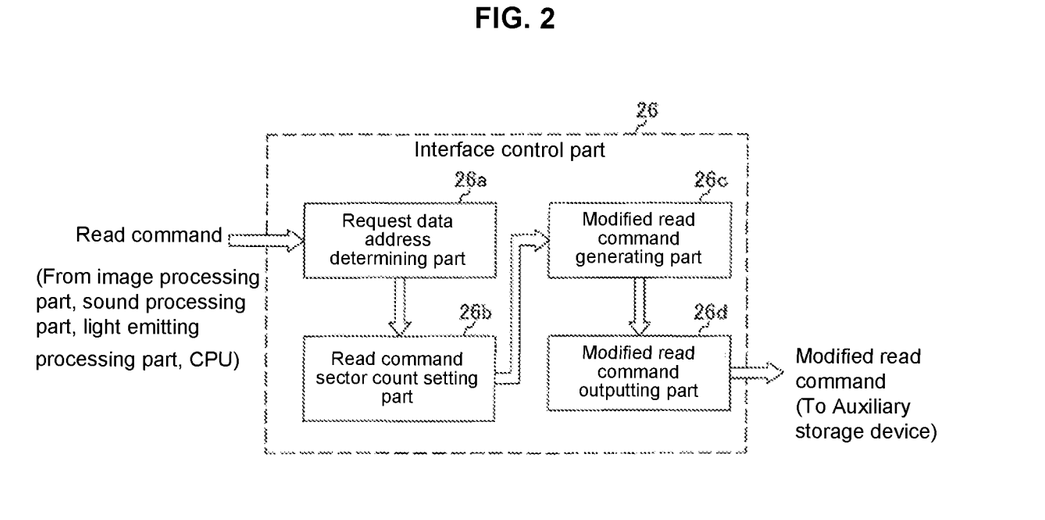
FIG. 2 is a functional block diagram illustrating a configuration of an interface control part provided in a data processing processor according to the embodiment of the present invention.

Referring to FIG. 2, description will be made on a configuration of a functional block of the interface control part shown in FIG. 1. FIG. 2 is a functional block diagram illustrating a configuration of the interface control part provided in the data processing processor according to the embodiment of the present invention.

The interface control part 26 includes a request data address determining part 26a, a read command sector count setting part 26b, a modified read command generating part 26c and a modified read command outputting part 26d.

The request data address determining part 26a inputs the read command outputted from any one of the image processing part 14, the sound processing part 18, the light emitting processing part 22 and the CPU 12 which are provided in the data processing processor 10, and determines which processing part (or the CPU) requests from the address of the data requested by the read command.

Figure 7:
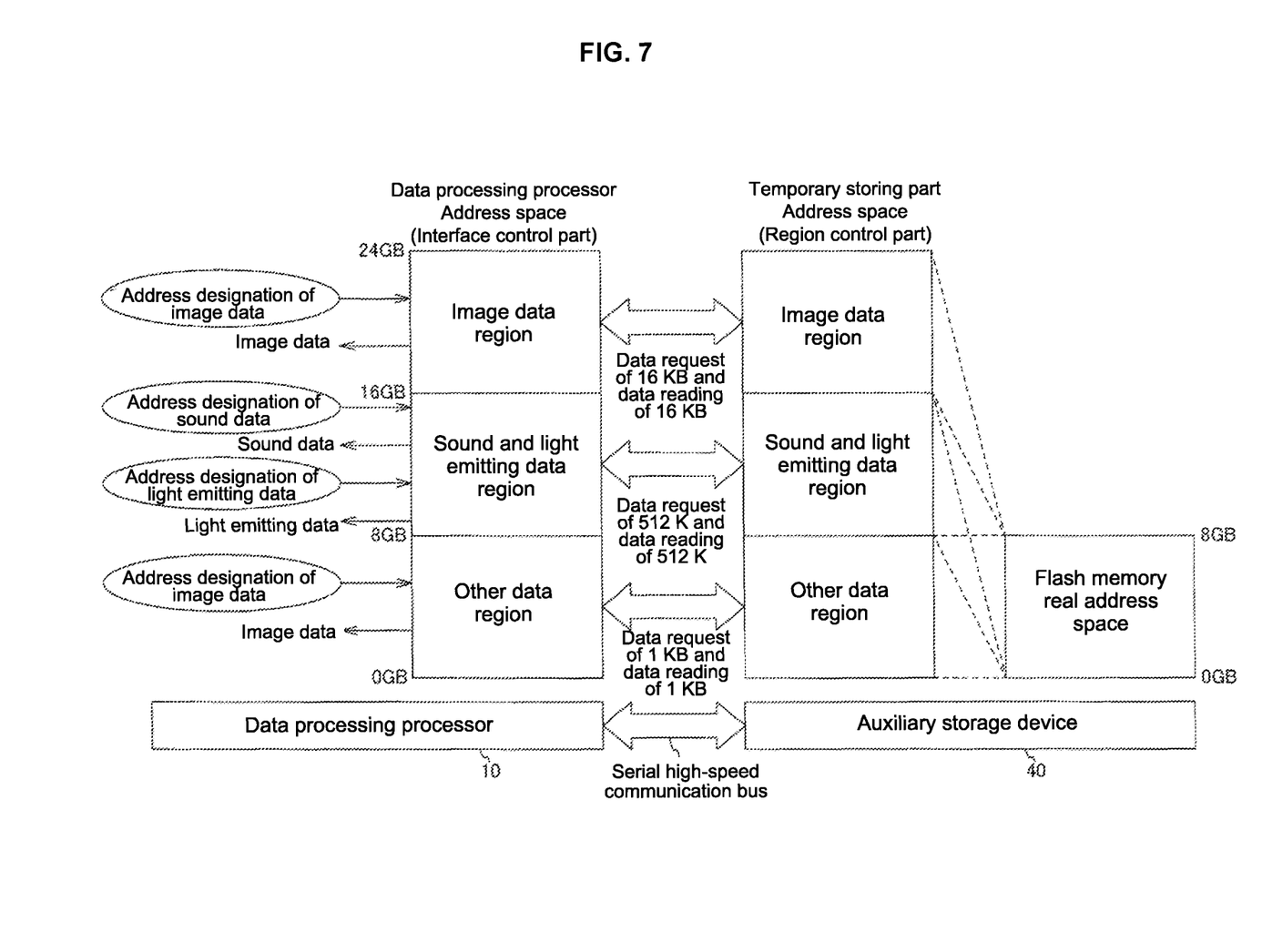
FIG. 7 is a view illustrating a plurality of temporary storing regions of the temporary storing part and a flow of data between the data processing processor and the auxiliary storage device of the information processing apparatus according to the embodiment of the present invention.

For example, as shown in FIG. 7, in the case where 0 gigabyte (hereinafter, referred to as "GB") to GB in an address space at the side of the data processing processor 10 is assigned as other data, 8 GB to 16 GB is assigned as the sound and light emitting data and 16 GB to 24 GB is assigned as the image data, if the address of the requested data falls within the region of 16 GB to 24 GB, it is determined as the readout request of the image data.

In other words, in the data processing processor 10, the read command is expressed at 35 bits and the data processing processor 10 designates the address of the other data. In this case, the upper 2 bits are set as "00" and the address for 8 GB which is a real address space of the flash memory is designated with the remaining 33 bits. Further, in the case where the data processing processor 10 designates the sound and light emitting data, by setting the upper 2 bits to "01", the address space of the data processing processor 10 becomes 8 GB to 16 GB, so that the address for 8 GB which is the real address space of the flash memory is designated with the remaining 33 bits. Furthermore, in the case where the data processing processor 10 designates the image data, by setting the upper 2 bits to "10", the address space of the data processing processor 10 becomes 16 GB to 24 GB, so that the address for 8 GB which is the real address space of the flash memory is designated with the remaining 33 bits. In this way, the data types are designated by the upper 2 bits and the interface control part 26 designates the real address of the flash memory with the remaining 33 bits except the upper 2 bits. Thus, the reading of the data is implemented.

The read command sector count setting part 26b sets a sector count value to be contained into the read command to a register, corresponding to each data type (the image data, the sound and light emitting data, the other data) determined by the request data address determining part 26a. In this regard, in this embodiment, as one example, it is set that the image data is read by 16 kilobyte (hereinafter, referred to as "KB"), the sound and light emitting data is read by 512 byte and the other data is read by 1 KB. Therefore, the read command sector count setting part 26b sets each sector count value to each register as 16, 1 and 2.

The modified read command generating part 26c contains the sector count value set to the register of the read command sector count setting part 26b into the read command to generate a modified modification read command.

Figure 3:
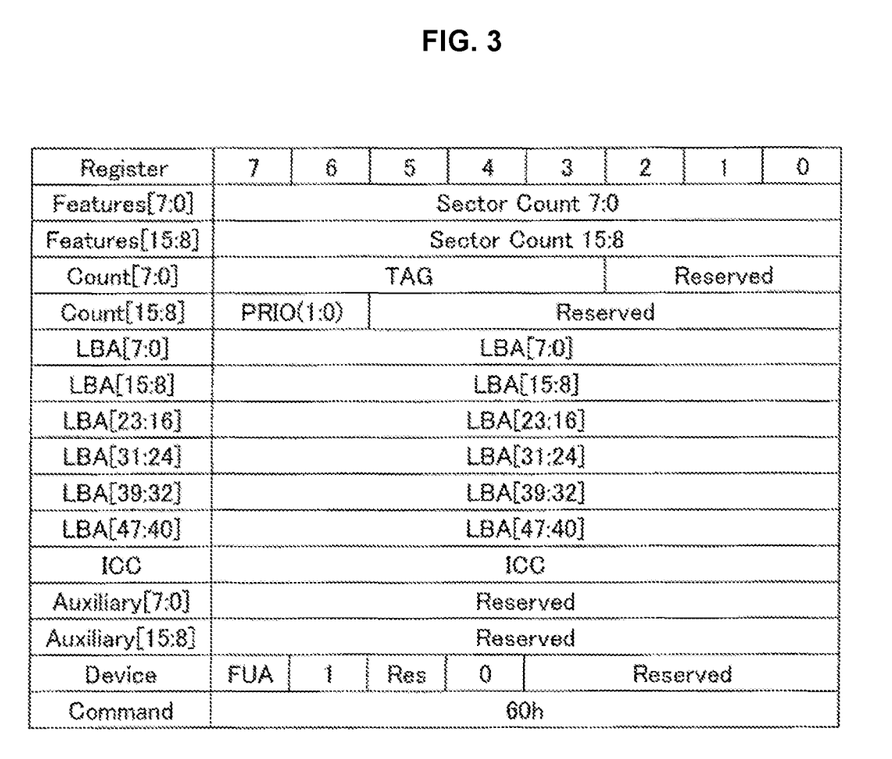
FIG. 3 is a view showing a configuration of a read command packet according to the embodiment of the present invention.

The modified read command outputting part 26d deletes the upper 2 bits in the read request of 35 bits issued from the image processing part 14, the sound processing part 18, the light emitting processing part 22 and the CPU 12 of the data processing processor 10, sets the remaining request data to an LBA (Logical Block Addressing) of a command packet (FIS: Frame Information Structure) of an SATA standard as shown in FIG. 3 as the LBA which is the real address of the flash memory, and further sets the sector count determined by the modified read command generating part 26c to the register assigned to the features (Features) of the command packet to output it to the auxiliary storage device 40 as a new read command.

In this regard, in the SATA (Serial ATA) standard which is one of standards of the serial high-speed communication bus, there exist items to be set other than the LBA and the sector count to set the unit of the readout data amount as the command packet. In addition to that, a cutoff treatment and the like of the lower bits are implemented to designate the real address of the flash memory depending on the readout unit of the flash memory. However, their detail descriptions are omitted.

<Region Control Part>

Figure 4:
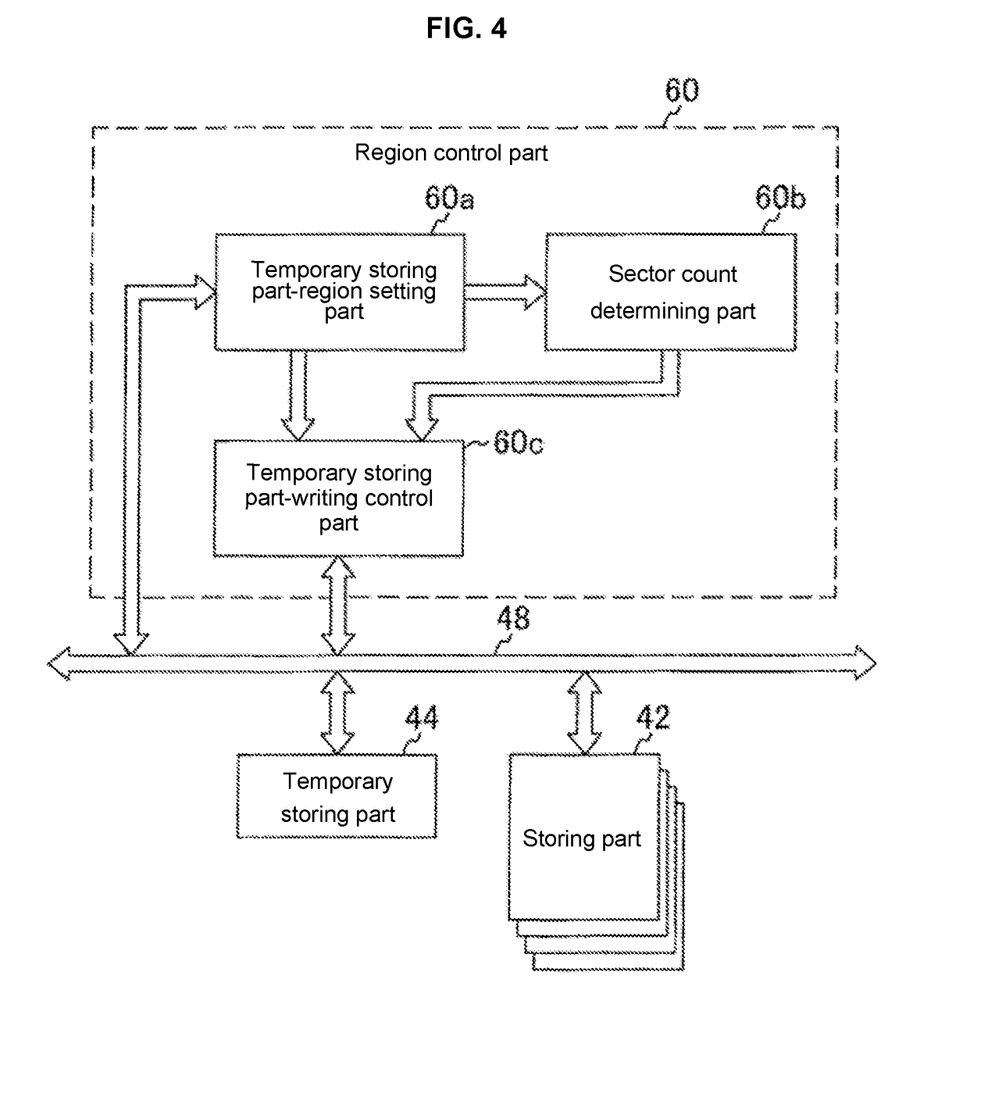
FIG. 4 is a functional block diagram illustrating a configuration of a region control part provided in an auxiliary storage device according to the embodiment of the present invention.

Referring to FIG. 4, description will be made on a configuration of a functional block of the region control part shown in FIG. 1. FIG. 4 is a functional block diagram illustrating a configuration of the region control part provided in the auxiliary storage device according to the embodiment of the present invention.

The region control part 60 includes a temporary storing part-region setting part 60a, a sector count determining part 60b, and a temporary storing part-writing control part 60c.

The temporary storing part-region setting part 60a sets regions of the DRAM to be cached to the register depending on the data types (the image, the sound, the light emitting and the others) to be cased to the temporary storing part 44. The setting of the regions can be implemented arbitrarily. For example, in the case where the capacity of the DRAM is 2 GB, 1 GB is assigned for the image data, 512 MB is assigned for the sound and light emitting data, and 512 MB is assigned for the other data. In this way, a large cache is secured for the image data and a relatively small cache with respect to the temporary storing region (cache region) for the image data is secured for the sound and light emitting data. In this regard, although the sound and light emitting data uses one region together, a region may be assigned to each data. Further, the sound and light emitting data and the other data may use one region together or may be assigned to a region which is different from the region used for the image data.

The sector count determining part 60b determines the data type (the image data, the sound and light emitting data and the other data) requested by the read command by determining the sector count value contained in the read command.

The temporary storing part-writing control part 60c caches (writes) the data read from the storing part to the temporary storing region of the temporary storing part 44 set to the register of the temporary storing part-region setting part 60a depending on the data types determined by the sector count determining part 60b.

In this regard, the region control part 60 is implemented by a micro processor contained in the memory controller 46, cooperates with the whole control part 50 and the sequence control part 52, reads the date from the storing part 42 according to the read command received from the data processing processor 10 and stores the read data to the temporary storing part 44 as the cache.

<Operation Flow of Interface Control Part>

Figure 5:
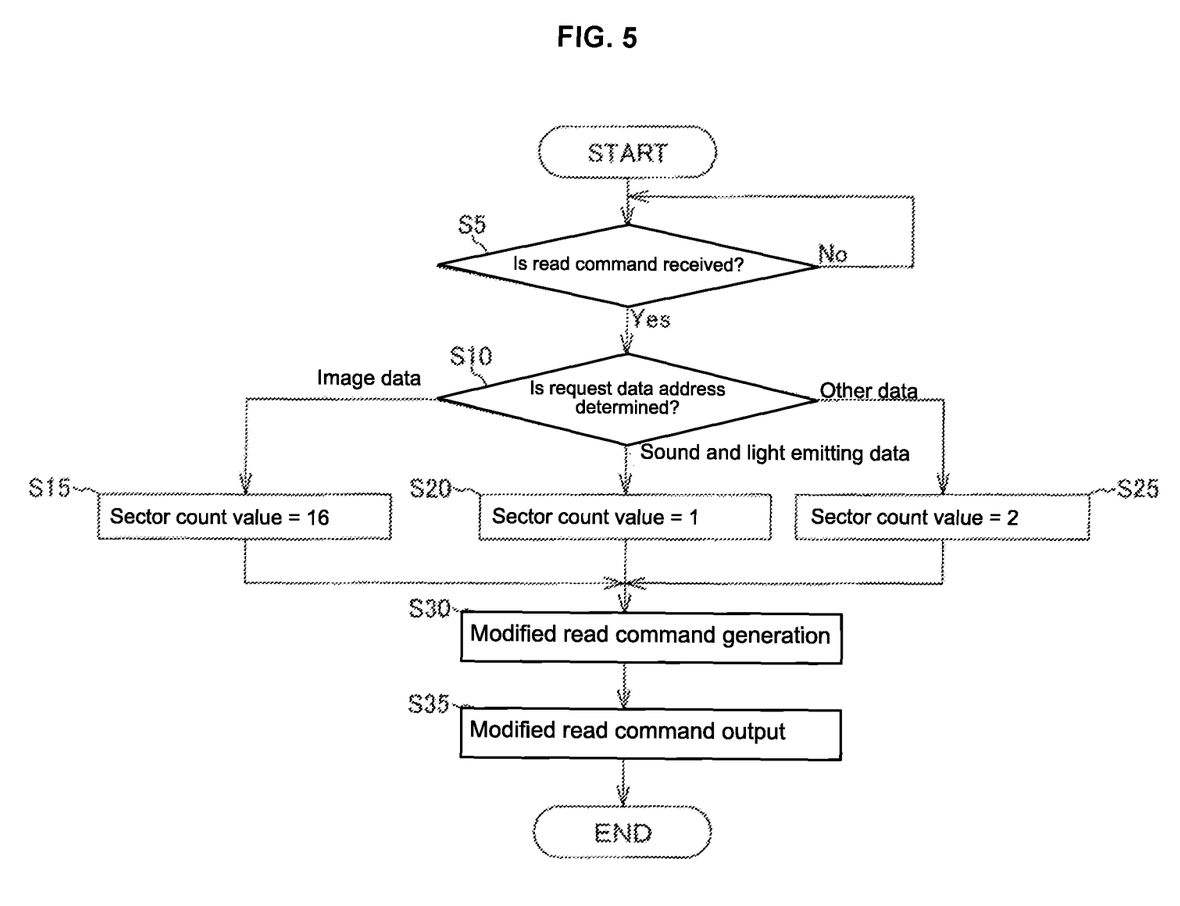
FIG. 5 is a flow chart for explaining an operation of an interface control part provided in the data processing processor according to the embodiment of the present invention.

Referring to FIG. 5, description will be made on an operation flow of the interface control part shown in FIG. 2. FIG. 5 is a flow chart for explaining an operation of the interface control part provided in the data processing processor according to the embodiment of the present invention.

In the step S5, the request data address determining part 26a determines whether or not the read command is received from the image processing part 14, the sound processing part 18 or the like. In the case where the read command is received, the process shifts to the step S10.

In the step S10, the request data address determining part 26a inputs the read command outputted from the image processing part 14, the sound processing part 18, the light emitting processing part 22 or the CPU 12 provided in the data processing processor 10 and determines which processing part (or CPU) requests from the address of the data requested by the read command.

Here, description will be made on the address space that the data processing processor 10 is accessible in details. In this regard, the address described below means "the address of the requested data" shown in Table 1.

(1) If the address in 0 GB to 8 GB is represented by a duodecimal scale of 35 bits, it becomes as follows:
000 0000 0000 0000 0000 0000 0000 0000 0000 to 001 1111 1111 1111 1111 1111 1111 1111 1111.

(2) If the address in 8 GB to 16 GB is represented by the duodecimal scale, it becomes as follows:
010 0000 0000 0000 0000 0000 0000 0000 0000 to 011 1111 1111 1111 1111 1111 1111 1111 1111.

(3) If the address in 16 GB to 24 GB is represented by the duodecimal scale, it becomes as follows:
100 0000 0000 0000 0000 0000 0000 0000 0000 to 101 1111 1111 1111 1111 1111 1111 1111 1111.

Referring to the 34th bit and the 35th bit of the designated address, (1) they become 00 in 0 GB to 8 GB, (2) they become 01 in 8 GB to 16 GB and (3) they become 10 in 16 GB to 24 GB. By determining which digit is "1", it is possible to determine which address spaces are designated.

In other words, the request data address determining part 26a provided in the interface processing part 26 of the data processing processor 10 determines as (3) if the first bit of the upper 2 bits is "1", (2) if the first bit of the upper 2 bits is "0" and the second bit thereof is "1" and (1) if the first bit and second bit of the upper 2 bits are "0". The request data address determining part 26a refers to a conversion table shown in Table 1 and obtains the data type corresponding to the address of the requested data and the sector count value corresponding to the data type.

Table 1 is a table which shows the data types corresponding to the addresses of the requested data and the sector count values corresponding to the data types, which is stored in the interface control part 26 as the conversion table.

TABLE 1

| Addresses of requested data | Data types | Sector count values |
| --- | --- | --- |
| Address corresponding to 16 GB to 24 GB | Image data | 16 |
| Address corresponding to 8 GB to 16 GB | Sound and Light emitting data | 1 |
| Address corresponding to 0 GB to 8 GB | Other data | 2 |

In the case where the address of the requested data designates the image data, the process shifts to the step S15. The read command sector count setting part 26b collates the data type (the image data) determined by the request data address determining part 26a as a key with the conversion table shown in Table 1 to obtain the sector count value to be contained in the read command, corresponding to the data type. For example, 16 is set to the register.

In the case where the address of the requested data designates the sound and light emitting data, the process shifts to the step S20. The read command sector count setting part 26b collates the data type (the sound and light emitting data) determined by the request data address determining part 26a as a key with the conversion table shown in Table 1 to obtain the sector count value to be contained in the read command, corresponding to the data type. For example, 1 is set to the register.

In the case where the address of the requested data designates the other data, the process shifts to the step S25. The read command sector count setting part 26b collates the data type (the other data) determined by the request data address determining part 26a as a key with the conversion table shown in Table 1 to obtain the sector count value to be contained in the read command, corresponding to the data type. For example, 2 is set to the register.

In the step S30, the modified read command generating part 26c sets the request data to the LBA (Logical Block Addressing) which is the real address of the flash memory while setting the sector count value obtained by the read command sector count setting part 26b to the register assigned to the features (Features) of the command packet (FIS: Frame Information Structure) of the SATA standard to generate the modified read command.

In the step S35, the modified read command outputting part 26d outputs the modified read command generated by the modified read command generating part 26c to the auxiliary storage part 40 as a new read command.

<Operation Flow of Region Control Part>

Figure 6:
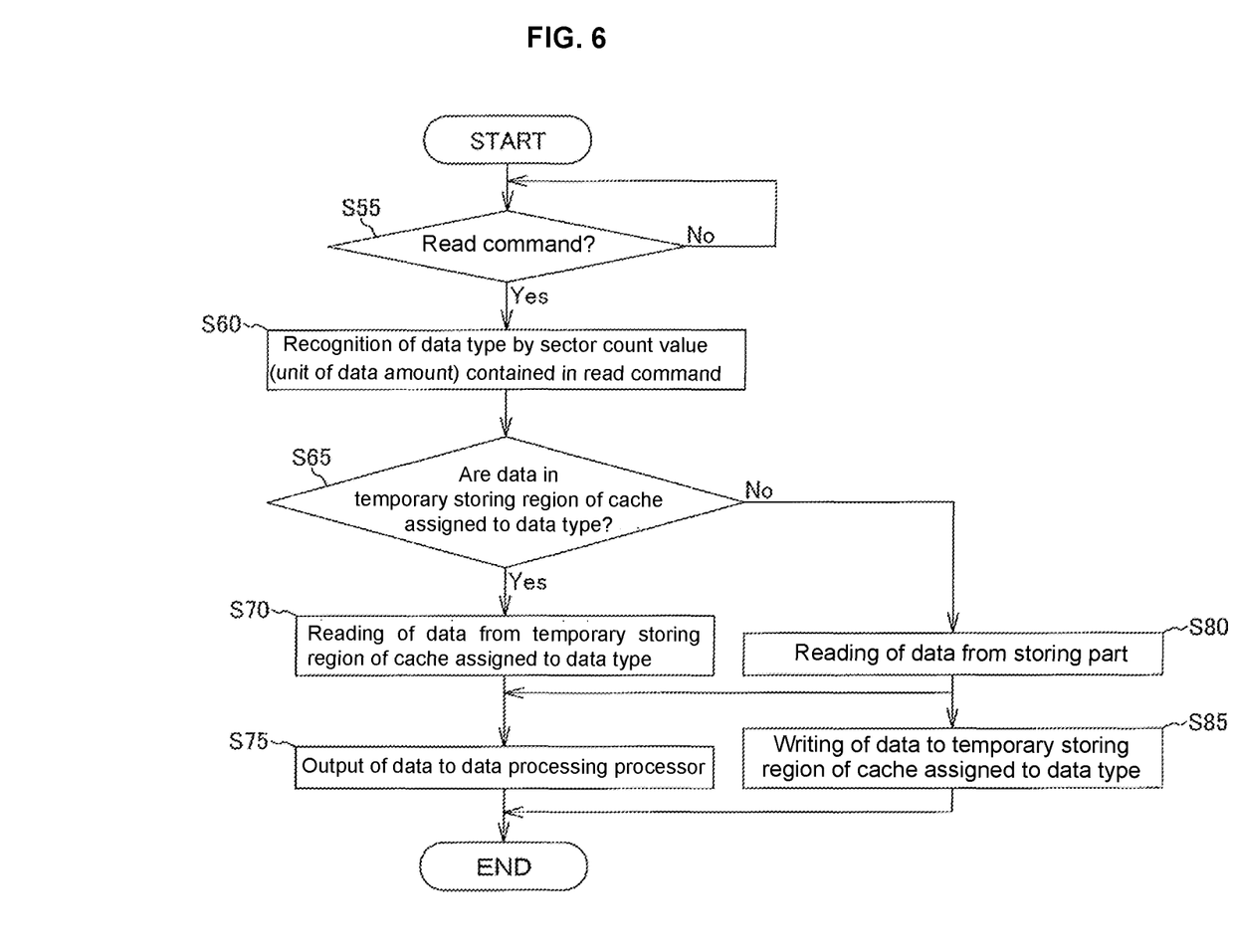
FIG. 6 is a flow chart for explaining an operation of a region control part provided in the auxiliary storage device according to the embodiment of the present invention.

Referring to FIG. 6, description will be made on an operation flow of the region control part. FIG. 6 is a flow chart for explaining an operation of the region control part provided in the auxiliary storage device according to the embodiment of the present invention.

In the step S55, the temporary storing part-region setting part 60a determines whether or not the read request is received from the interface control part 26. In the case where the temporary storing part-region setting part 60a receives the read request from the interface control part 26, the process shifts to the step S60.

In the step S60, the sector count determining part 60b determines the data type (the image data, the sound and light emitting data or the other data) by the sector count value contained in the read command to recognize the data type. In other words, the sector count determining part 60b collates the sector count value contained in the read command as a key with a conversion table shown in Table 2 to obtain the data type corresponding to the sector count value.

Table 2 is a table which shows the data types corresponding to the sector count values and the temporary storing regions (address space) corresponding to the data types, which is stored in the region control part 60 as the conversion table.

TABLE 2

| Sector Count Values | Data types | Temporary Storing Regions (Address Space) |
|---|---|---|
| 16 | Image data | Image data region |
| 1 | Sound and Light emitting data | Sound and light emitting data region |
| 2 | Other data | Other data region |

In the step S65, the temporary storing part-writing control part 60c collates the requested data type as a key with the conversion table shown in Table 2 to obtain the temporary storing region corresponding to the data type and determines whether or not the data is in the temporary storing region of the temporary storing part 44 (cache) assigned to the data type.

In the case where the data is in the temporary storing region of the temporary storing part 44 (cache) assigned to the data type (S65, Yes), the process shifts to the step S70. The temporary storing part-writing control part 60c reads the data from the temporary storing region of the temporary storing part (cache) assigned to the data type. At the same time, in the step S75, the temporary storing part-writing control part 60c outputs the data to the data processing processor 10.

On the other hand, in the case where the data is not in the temporary storing region of the temporary storing part 44 (cache) assigned to the data type (S65, No), the process shifts to the step S80. The temporary storing part-writing control part 60c reads the data from the storing part 42. Next, in the step S85, the temporary storing part-writing control part 60c caches (writes) the data read from the storing part 42 into the region of the temporary storing part 44 (DRAM) which is set to the register of the temporary storing part-region setting part 60a, corresponding to the data type determined by the sector count determining part 60b.

At this time, in the step S80, the temporary storing part-writing control part 60c reads the data from the storing part 42. At the same time, in the step S75, the temporary storing part-writing control part 60c outputs the data to the data processing processor 10.

In this regard, when the temporary storing part-writing control part 60c writes the data into the temporary storing region of the temporary storing part (cache), if there is a vacancy in the assigned temporary storing region, the temporary storing part-writing control part 60c stores (the data) in the vacancy temporary storing region. On the other hand, if there is no vacancy, the oldest data is deleted. Thus, it is possible to use an LRU algorism (Least Recently Used) to cache therein. Further, it is also possible for the temporary storing part-writing control part 60c to cache the data by using an LFU (Least Frequently Used) algorism.

<Temporary Storing Region>

Referring to FIG. 7, description will be made on the temporary storing region of the temporary storing part 44.

In the example shown in FIG. 7, the temporary storing part 44 ensures three regions for the image data, the sound and light emitting data and the other data. As shown in the same figure, it is preferred that the address space of the temporary storing part is divided in the same manner as the real address space of the flash memory. In this regard, a way for dividing the regions does not necessarily depend on a physical structure of a DDR DRAM used for the temporary storing part 44, and it is sufficient that it can be recognized that the regions are logically divided. Further, each data region of the address space ensures the same amount as the real address of the storing part 42. However, the region used as the temporary storing part (cache) actually is limited by the auxiliary storage device 40.

Meanwhile, in the high speed data communication, the reading of the data is implemented by using the sector count value which is a predetermined unit of the data amount and dividing multiple times (plurality of requests). In addition to that, the sector count value is different, which corresponds to the data type. For example, for the image date having the relatively large size, the sector count value is set to be larger as compared to the sound data and the light emitting data.

For example, in the SATA I/F which is one example of the serial high-speed communication bus, since the sector count value is defined, a data amount for reading at a time is limited. A minimum data amount for reading is 512 byte and a maximum data amount for reading is 32 megabyte (hereinafter, referred to as "MB"). In this regard, a data amount for writing is also the same.

Here, description will be made on technical reasons that the unit of the data amount of the image data is different from that of the sound and light emitting data.

First, since the amount of the image data is large as compared to the sound data and the light emitting data, it is usual that the data amount requested per unit time also becomes larger than the sound and light emitting data. Therefore, in the case where the image data is read, the number of accessing from the data processing processor 10 being a host device to the SAT SSD being one example of the auxiliary storage device 40 is decreased by setting the unit of the data amount for reading to be large, thereby assisting in high speed processing in the data processing processor 10.

On the other hand, since the data size of the sound and light emitting data is small as compared to the image data, if the reading thereof is implemented at the same unit as the readout unit of the image data, there is a possibility that unnecessary data are read, thereby resulting in waste of processing time to be taken for reading the unnecessary data. Therefore, by setting the readout unit to be small, high speed processing in the data processing processor 10 is to be achieved.

In the case of the SATA I/F, it is possible to set the unit of the data amount for reading to be in 512 byte to 32 MB as described above. However, according to the data type to be treated, the unit of the data amount at the time of reading is set so that it is possible for each processing part (the image processing part, the sound processing part, the light emitting processing part and the like) to implement the processing optimally. Therefore, in the case where it is necessary to treat the data amount more than the unit of the data amount at the set reading time, the read command is issued with dividing multiple times.

According to this embodiment, the data processing processor 10 sets the address space of the interface control part 26 depending on the data type to be read. The interface control part 26 determines the data type by the address space requested, sets the sector count to be contained in the read command and outputs the read command containing the sector count to the auxiliary storage device. On the other hand, the memory controller 46 of the auxiliary storage device 40 which has received the read command controls to determine the data type requested based on the sector count value contained in the read command and select the temporary storing region corresponding to the data type. Therefore, in the data corresponding to the plurality of the data types, it is possible to avoid the situation that only the specific data occupies the temporary storing part 44.

<Configurations, Operations and Effects of Features of Embodiment of Present Invention>

<First Feature>

An information processing apparatus 1 of the present feature is characterized by comprising: an auxiliary storage device 40 which includes; a storing part 42 for storing plural kinds of data corresponding to a plurality of data types, a temporary storing part 44 for temporarily storing the data read from the storing part 42 into temporary storing regions corresponding to the data types; and a memory controller 46 (control part) for controlling the storing part 42 and the temporary storing part 44, and a data processing processor 10 for reading the plural kinds of data from the auxiliary storage device 40 and outputting the data to predetermined processing parts corresponding to the data types, based on a request from a host CPU 2, wherein the data processing processor 10 includes an interface control part 26 for setting data type information according to the data type of the data which is requested to read, and wherein the memory controller 46 of the auxiliary storage device 40 controls the auxiliary storage device 40 to determine the data type requested based on the data type information contained in a read command from the data processing processor 10 and select the temporary storing region corresponding to the data type.

According to the present feature, the interface control part 26 of the data processing processor 10 sets the data type information according to the data type of the data which is requested to read. The memory controller 46 of the auxiliary storage device 40 controls the auxiliary storage device 40 to determine the data type requested based on the data type information contained in the read command from the data processing processor 10 and select the temporary storing region corresponding to the data type. Therefore, it is possible to select the temporary storing region of the temporary storing part 44 corresponding to the data type. In the date corresponding to the plurality of data types, it is possible to avoid the situation that only the specific data occupies the temporary storing part 44.

<Second Feature>

The data processing processor 10 of the present feature is characterized in that it designates an address of an address space of the interface control part 26 depending on the data type, and the interface control part 26 determines the data type based on the designated address space to generate the read command containing the data type information.

According to the present feature, the data processing processor 10 designates the address of the address space of the interface control part 26 depending on the data type, and the interface control part 26 determines the data type based on the designated address space to generate the read command containing the data type information. Therefore, it is possible to select the temporary storing region of the temporary storing part 44 corresponding to the data type. In the date corresponding to the plurality of data types, it is possible to avoid the situation that only the specific data occupies the temporary storing part 44.

<Third Feature>

The data type information of the present feature is characterized in that it is a unit of a communication data amount contained in the read command.

According to the present feature, since the data type information is the unit of the communication data amount contained in the read command, it is possible to select the temporary storing region of the temporary storing part 44, corresponding to the unit of the communication data amount. In the date corresponding to the plurality of data types, it is possible to avoid the situation that only the specific data occupies the temporary storing part 44.

<Forth Feature>

The data type information of the present feature is characterized in that it is a sector count value contained in the read command.

According to the present feature, since the data type information is the sector count value contained in the read command, it is possible to select the temporary storing region of the temporary storing part 44, corresponding to the sector count value. In the date corresponding to the plurality of data types, it is possible to avoid the situation that only the specific data occupies the temporary storing part 44.

<Fifth Feature>

In the information processing apparatus 1 of the present feature, the data types include image data, sound data and light emitting data.

According to the present feature, it is possible to distinguish the image data which is likely to occupy the cache memory from the other data. It is also possible to use the cache even in reading of the light emitting date and sound date having less acceptable amount of the delayed processing, thereby enabling the output of sound and light to be implemented appropriately.

\<Sixth Feature\>

In the information processing apparatus 1 of the present feature, the temporary storing regions are divided into two or more regions in which one region is used for storing the image data and other regions are used for storing the other data.

According to the present feature, since it is possible to separately use the divided regions for caching the image data which is likely to occupy the cache memory and for caching the sound data and the light emitting data other than the image data, it is possible to use the cache even in reading of the light emitting date and sound date having less acceptable amount of the delayed processing, thereby enabling the output of sound and light to be implemented appropriately.

\<Seventh Feature\>

A method of processing information of the present feature is characterized by a method of processing information implemented by an information processing apparatus 1, which comprises: an auxiliary storage device 40 including a storing part 42 for storing plural kinds of data corresponding to a plurality of data types, a temporary storing part 44 for temporarily storing the data read from the storing part 42 into temporary storing regions corresponding to the data types; and a memory controller 46 (control part) for controlling the storing part 42 and the temporary storing part 44; and a data processing processor 10 for reading the plural kinds of data from the auxiliary storage device 40 and outputting the data to predetermined processing parts corresponding to the data types, based on a request from a host CPU, wherein the data processing processor 10 implements an interface control step for setting data type information according to the data type of the data which is requested to read, and wherein the memory controller 46 (control part) of the auxiliary storage device 40 implements a step for controlling the auxiliary storage device 40 to determine the data type requested based on the data type information contained in a read command from the data processing processor 10 and select the temporary storing region corresponding to the data type.

According to the present feature, the data processing processor 10 implements the interface control step for setting the data type information according to the data type of the data which is requested to read. On the other hand, the memory controller 46 (control part) of the auxiliary storage device 40 implements the step for controlling the auxiliary storage device 40 to determine the data type requested based on the data type information contained in the read command from the data processing processor and select the temporary storing region corresponding to the data type. Therefore, in the date corresponding to the plurality of data types, it is possible to avoid the situation that only the specific data occupies to the temporary storing part 44.

DESCRIPTION OF REFERENCE SIGNS

1: Information processing apparatus, 2: Host CPU, 10: Data processing processor, 12: CPU, 14: Image processing part, 16: Display outputting part, 18: Sound processing part, 26: Interface control part, 26*a*: Request data address determining part, 26*b*: Read command sector count setting part, 26*c*: Modified read command generating part, 26*d*: Modified read command outputting part, 40: Auxiliary storage device, 42: Storing part, 44: Temporary storing part, 46: Memory controller, 60: Region control part, 60*a*: Temporary storing part-region setting part, 60*b*: Sector count determining part, 60*c*: Temporary storing part-writing control part

What is claimed is:

1. An information processing apparatus for game machines providing data types including image data, sound data, light emitting data and other data comprising:

an auxiliary storage device, including
   a memory for storing the data types of image data, sound data, light emitting data and other data,
   a temporary memory for temporarily storing a data read from the memory into temporary storing regions respectively corresponding to each of the data types, and a controller for controlling the memory and the temporary memory;

a host CPU; and a data processing processor for reading plural kinds of data from the auxiliary storage device and outputting the plural kinds of data to predetermined processing units corresponding to the data types, based on a request from host CPU, wherein the data processing processor includes an interface control part for setting data type information to a read command according to an address of an address space of the interface control part outputted from any one of the processing units, wherein the data processing processor includes an image processing part, a sound processing part, a light emitting processing part and the auxiliary storage device includes a region control part comprising a sector count determining part, a temporary storing part-writing control part and a temporary storing part-region setting part, wherein the interface control part comprises a request data address determining part, a read command sector count setting part, a modified read command generation part and a modified read command outputting part, wherein the controller of the auxiliary storage device controls the auxiliary storage device to determine the data types requested based on the data type information contained in a modified read command from the data processing processor and select the temporary storing region corresponding to the data types, wherein the data processing processor further comprises a display outputting part, a sound outputting part and a light emitting outputting part, wherein each of these outputting parts of the data processing processor outputs the read command to the interface control part based on a request from the host CPU, and the read command sector count setting part of the interface control part sets a sector count from an address of the requested read command, the modified read command generation part of the interface control part generates the modified read command and the modified read command outputting part of the interface control part outputs the modified read command to the auxiliary storage device, and wherein the sector count determining part of the auxiliary storage device determines the sector count of the modified read command, the temporary storing part-writing control part of the auxiliary storage device selects the temporary storing regions of a temporary storing part based on a determined result of the sector count, and the temporary storing part-region setting part of the auxiliary storage device stores a data read from a storing part in the temporary storing part;

wherein the read command sector count setting part sets a sector count value to be contained into the read command to a register, corresponding to each data type including the image data, the sound data and the light emitting data, other data, determined by the request data address determining part, and wherein the read command sector count setting part sets the sector count value of the image data greater than the sector count value of the sound data and the light emitting data or the other data.

2. The information processing apparatus according to claim 1, wherein the data type information is a unit of a communication data amount contained in the modified read command.

3. The information processing apparatus according to claim 1, wherein the temporary storing regions are divided into two regions in which one region is used for storing the image data and other region is used for storing the other data.

4. The information processing apparatus according to claim 1, wherein the data processing processor designates an address of an address space of the interface control part depending on the data type, and wherein the request data address determining part in the interface control part determines the data type based on the designated address of the address space.

* * * * *